Patented Oct. 28, 1952

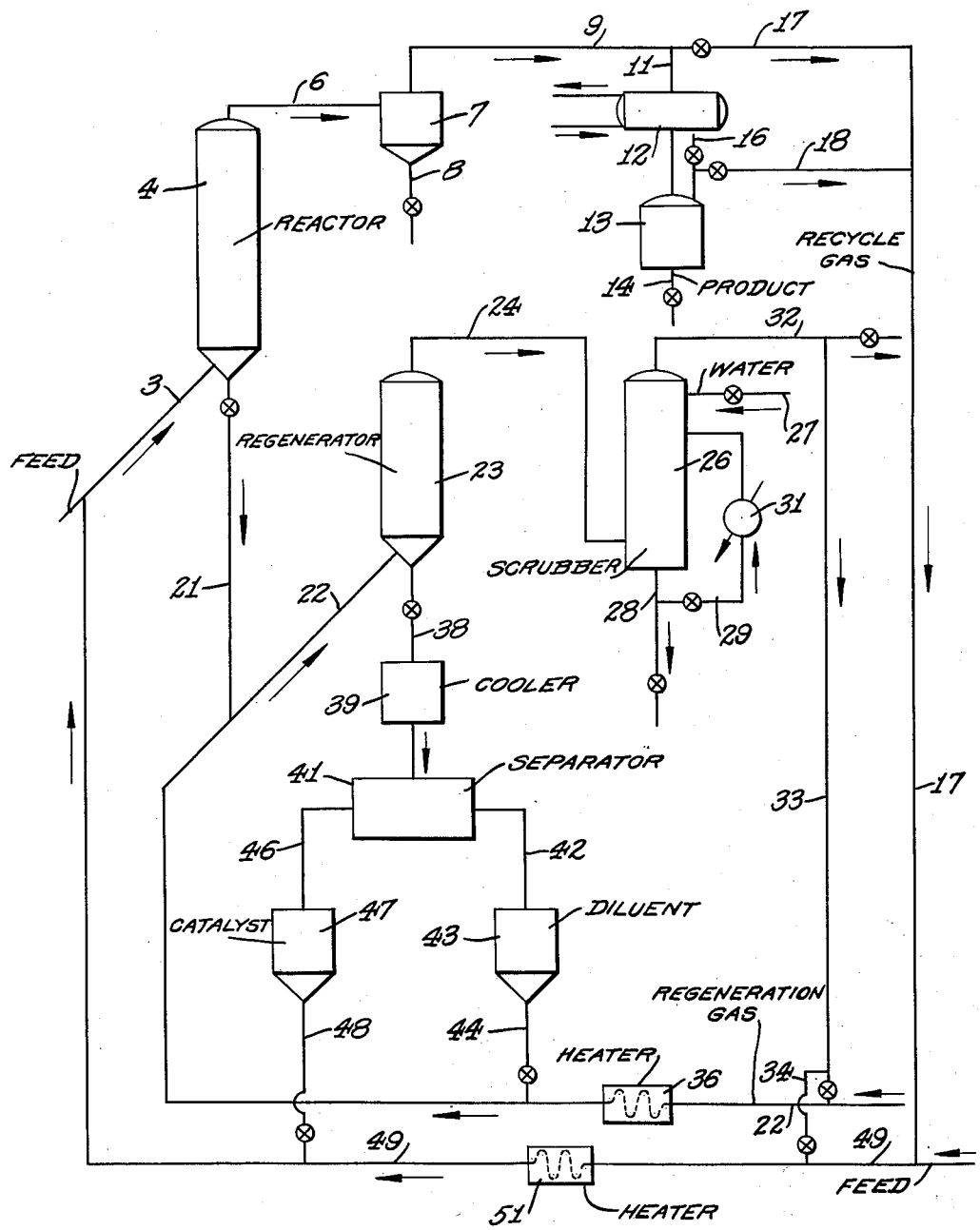

2,615,911

UNITED STATES PATENT OFFICE 2,615,911

SYNTHESIS OF ORGANIC COMPOUNDS

Theodore S. Williams, Asbury Park, N. J., assignor to The M. W. Kellogg Company, Jersey City, N. J., a corporation of Delaware Application March 21, 1947, Serial No. 736,323

10 Claims. (Cl. 260—449.6)

This invention relates to the hydrogenation of carbon oxides to produce oxygenated organic compounds and hydrocarbons. In one aspect this invention relates to the activation and reactivation of hydrogenation catalysts. The process of this invention is applicable to the activation and reactivation of catalysts used to react hydrogen with carbon monoxide, carbon dioxide, and organic compounds containing the carbonyl group, such as ketones, aldehydes, acyl halides, organic acids and their salts and esters, acid anhydrides, and amines, and herein designated as carbon oxides, whose reaction with hydrogen is promoted by catalysts which are effective with carbon monoxide.

It has been known for some time that hydrogen and carbon monoxide may be made to react exothermically in the presence of a catalyst under specific reaction conditions to form hydrocarbons and oxygenated compounds. In general, the synthesis of these organic compounds by the hydrogenation of carbon monoxide is accomplished in the presence of a metal or an oxide of a metal chosen from group VIII of the periodic table at pressures below about 500 pounds per square inch gage and at temperatures below about 750° F. for the production of both hydrocarbons and oxygenated compounds, and at pressures between about 1,000 and about 10,000 pounds per square inch gage and at temperatures above 750° F. for the synthesis of oxygenated organic compounds as the major product.

The synthesis feed gas or reaction mixture comprises a mixture of about one to two mols of hydrogen to one mol of carbon monoxide and may be prepared by the catalytic conversion of natural gas, steam, and carbon dioxide.

Various methods have been utilized to effect the hydrogenation of carbon monoxide, such as by fixed or stationary bed catalyst technique or by fluid bed technique. In the stationary or fixed bed technique, the reaction mixture is passed through a stationary bed of granular catalyst in the reaction zone, and, in the fluid bed technique, the reaction mixture is passed through a mass of fluidized catalyst in which the catalyst is suspended in finely divided form in the reaction mixture in the reaction zone. This invention has particular application to the finely divided fluidized catalyst technique in which the catalyst is maintained in a fluidized condition in the reaction zone.

Often a catalyst must be treated prior to use as a hydrogenation catalyst to render the catalyst particularly active for the hydrogenation reaction. For example, in the hydrogenation of carbon monoxide in a fluidized process in the presence of a reduced iron catalyst, finely divided iron oxide is reduced prior to introduction into the hydrogenation reaction zone. It is desirable to reduce the iron oxide in the fluidized condition, if possible, in the presence of a reducing gas, such as hydrogen, under appropriate conditions of temperature and pressure to effect either partial or total reduction of the iron oxide to metallic iron. Also, after use of a particular hydrogenation catalyst in hydrogenating carbon monoxide, the catalyst becomes partially deactivated and must be reactivated intermittently or continuously during the course of the hydrogenation process. In this latter respect usually the hydrogenation catalyst is withdrawn from the reaction zone, such as, for example, when a reduced iron catalyst is used, and the partially deactivated reduced iron catalyst is reactivated by reduction and/or oxidation steps and returned to the hydrogenation reaction zone. It is also desirable to reactivate the catalyst in the fluidized condition, if possible, in the presence of a reducing or an oxidizing gas. Such reactivation treatment is necessitated as a result of the catalyst becoming partially oxidized and contaminated with waxes and carbonaceous deposits during the hydrogenation of the carbon monoxide. The partially oxidized catalyst may be treated by oxidation in one step and subsequently the catalyst is re-reduced in a second and separate step.

The activation of the catalyst prior to use and the reactivation of the catalyst after use requires temperatures substantially greater than the temperature used during the hydrogenation of carbon monoxide with the catalyst, if maximum efficiency is to be achieved and minimum contact time is to be used. It has been found that at the relatively high temperatures of activation or reactivation it is often difficult, if not impossible, to maintain the finely divided catalyst in a fluidized suspended condition in the activation zone. As a result of such difficulty, the catalyst is often pelleted and activated in a stationary bed, or the catalyst may be suspended and reduced at a relatively low temperature. When using a low temperature to maintain the catalyst in a fluidized suspended condition in the activation zone, a much longer period of time is required to reduce the iron oxide than at temperatures above 900° F. or higher. It is seen, therefore, that considerable difficulty accompanies the activation and reactivation of a fluidized type catalyst, and it is much to be desired, therefore, to provide a process or a method for eliminating or minimizing such difficulties.

The reason for the difficulty of fluidizing the catalyst during activation or reactivation is not thoroughly understood, but it is known that at the higher temperatures of activation and reactivation necessary for maximum efficiency and minimum contact time the catalyst loses its fluidization characteristic which it has at lower temperatures, such as those temperatures used in the hydrogenation reaction. As a result of the loss of its fluidization characteristic, the catalyst does not achieve the conventional fluidized condition but settles and agglomerates in the activation zone. For example, in the reduction of iron oxide or in the re-reduction of a used or partially oxidized iron catalyst, the reaction and adsorption of hydrogen on the surface of the catalyst particle at the relatively high temperatures required may prevent normal fluidizing conditions from being achieved. This theory is offered merely as a possible explanation of the difficulty in fluidizing the finely divided catalysts during activation and reactivation and should not be considered unduly limiting to the invention in any respect. It is known that it is very difficult to maintain a finely divided catalyst in a fluidized condition during activation, in particular during reduction of an iron catalyst with hydrogen, at temperatures substantially above those temperatures used during the synthesis reaction.

It in an object of this invention to obviate the above difficulties accompanying the activation of a hydrogenation catalyst in a fluidized condition.

Another object of this invention is to provide a process for the hydrogenation of carbon monoxide in the presence of a finely divided hydrogenation catalyst.

It is another object of this invention to provide a process for the activation or reactivation of a finely divided hydrogenation catalyst.

Still another object of this invention is to increase the temperature permissible during activation or reactivation of a finely divided hydrogenation catalyst in a fluidized condition.

A further object is to provide a method for the reduction of a metal compound.

It is a further object of this invention to reduce the period of time required for the activation or reactivation of a finely divided hydrogenation catalyst in a fluidized condition.

Yet a further object of this invention is to prevent the agglomeration and settling of a finely divided hydrogenation catalyst during the activation or reactivation thereof using a fluidized technique.

Various other objects and advantages of this invention will become apparent to those skilled in the art from the accompanying description and disclosure.

According to this invention I have found that a finely divided hydrogenation catalyst may be maintained in suspension and in a fluidized condition during activation and reactivation thereof by admixing a diluent material or materials with said catalyst to be treated in an amount sufficient to maintain the resulting mass in suspension and in a fluidized condition without classification or segregation between the catalyst and diluent material during the activation treatment, said diluent material comprising a finely divided inert solid capable of maintaining suspension under the conditions of activation and capable of separation from said catalyst.

In one aspect the invention comprises an improvement of the process for the hydrogenation of a carbon oxide in the presence of a fluidized finely divided hydrogenation catalyst in which said finely divided catalyst is reactivated by suspending the catalyst in a regeneration gas such that the catalyst is maintained in a fluidized and suspended condition in the regeneration zone by admixing a diluent material therewith.

Such a solid diluent material which is substantially inert and capable of maintaining a suspended or fluidized condition under the conditions of activation and reactivation of the hydrogenation catalyst, and which is capable of separation from the catalyst, comprises silica and/or alumina materials, such as silica sand, quartz, alumina, bentonite type clay, diatomaceous earths, bauxite, kieselguhr, and Super Filtrol. These materials will retain a fluidized condition in either an oxidizing or reducing atmosphere at temperatures up to about 2000° F. or above. Thus, by diluting the catalyst with such a material which can maintain a fluidized condition under the conditions of activation, the fluidization characteristic of the diluent is imparted to the entire resulting mass. Preferably, the diluent should comprise at least 50 per cent by weight of the resulting mixture and generally will comprise about 75 to about 95 per cent by weight.

As used herein, activation and reactivation of the catalyst is defined as any treatment of a catalyst, such as oxidation or reduction, which renders the catalyst suitable to promote the reaction between hydrogen and carbon monoxide to produce organic compounds. Also, in referring to a fluidized or suspended condition of the catalyst, it is meant that the finely divided catalyst particles are suspended in an upward flowing gaseous mixture under conditions such that the suspended catalyst will form a conventional pseudo-liquid dense phase of catalyst in the reaction zone or alternatively under conditions such that the catalyst itself is entrained in the gaseous mixture passing through the reaction zone and is removed therewith. In operations using the pseudo-liquid dense phase of catalyst, the reaction chamber is usually of such size that only a portion of the chamber is occupied by the dense phase of catalyst and a relatively dilute phase containing a very small proportion of catalyst appears in the upper portion of the chamber with an interface between the two phases. It is not necessary, however, in all instances that a dilute phase be present in the reaction chamber but the chamber may be of such size or the quantity of catalyst such that only a dense phase is present therein. This dense phase of catalyst is further characterized by being a highly turbulent mixture of catalyst particles.

To maintain the catalyst in either of the above suspended conditions, the linear velocity of gases passing upward through the reaction zone and the catalyst mass will range between about 0.1 and about 40 feet per second. The pseudo-liquid fluidized condition is usually achieved by maintaining the linear gas velocity between about 0.5 and about 6 feet per second and under these conditions the concentration of catalyst in the reaction zone will range between about 25 or 40 pounds per cubic foot of gas to as high as 120 pounds per cubic foot of gas. On the other hand, when the catalyst is entrained in the gaseous mixture and passes through the reaction zone with the gases, the linear velocity of the gaseous mixture is above about 6 feet per second and usually between about 10 and about 40 feet per second. Under the latter conditions, the concentration of catalyst in the reaction zone will be between about 3 and about 20 pounds per cubic foot of gas.

The catalyst and diluent are employed in a fine state of subdivision. Preferably, the powdered catalyst and diluent initially contain no more than a minor proportion by weight of material whose particle size is greater than 250 microns. Preferably, also, the greater proportion of the catalyst mass and diluent mass comprise material whose particle size is smaller than 100 microns, including at least 25 weight per cent of the material in particle size smaller than 40 microns. A highly desirable powdered catalyst and/or diluent comprises at least 75 per cent by weight of material smaller than 150 microns in particle size and at least 25 per cent by weight of material smaller than 40 per cent in particle size.

The velocities, concentration, and particle sizes of the catalyst and diluent heretofore described are characteristic of the conditions required for both the hydrogenation of carbon monoxide and the activation or reactivation treatments when it is necessary to maintain the catalyst or the catalyst and diluent in a suspended condition in an upward flowing gaseous mixture.

This invention is applicable to the activation and reactivation of various catalysts suitable for the hydrogenation of a carbon oxide. The catalyst to which the present invention is applicable is a finely divided powder consisting of a metal or metal oxide which is or becomes in the reaction zone a catalyst for the reaction. The catalyst may comprise such a metal and metal oxide or a mixture of such a metal or metal oxides. Finely divided metallic iron or iron oxide or a mixture of metallic iron and iron oxide are representative examples of the catalysts employed in this invention. Other metals and their oxides may be employed which are effective in catalyzing the hydrogenation of a carbon oxide, such as cobalt, nickel, and platinum and other metals of group VIII of the periodic table, and chromium, zinc, and cerium. While the catalyst powder consists essentially of such catalytic metals or their oxides, it may include also a minor amount of promoting ingredients, such as alkalies, alumina, silica, thoria, manganese oxide, and magnesia impregnated in the catalyst. In the following description and claims catalyst powders consisting of a metal and/or a metal oxide and containing at most a minor proportion of a promoter are referred to as a "finely divided hydrogenation catalyst."

The present invention is also applicable to the reduction of metal compounds to the elementary metal. For example, in the production of finely divided iron for use in powder metallurgy, an oxide of iron may be ground to the desired size, and then reduced in a fluidized condition in the presence of a diluent material of the type hereinbefore described. The invention has various applications to those situations where it is desirable to maintain a finely divided material in a fluidized condition at temperatures under which it is ordinarily very difficult, if not impossible, to maintain the finely divided material in such a fluidized condition.

In the hydrogenation of carbon monoxide in the presence of a catalyst containing reduced iron as the major component, a temperature between about 450° F. and about 750° F. is generally used. Activating or reactivating such a catalyst by reducing the catalyst, such as in the presence of hydrogen, requires a temperature between about 900° F. and about 1600° F. for the minimum amount of time and maximum efficiency. In the hydrogenation of carbon monoxide in the presence of a catalyst containing reduced cobalt as the major component, a temperature between about 350° F. and about 550° F. is used. The activation or reactivation of the cobalt catalyst by reduction in the presence of hydrogen requires a temperature between about 650° F. and about 1200° F. or higher. Using either catalyst, a reaction pressure between about 50 and about 500 pounds per square inch gage is suitable for both the hydrogenation of the carbon monoxide and the reduction of the catalyst. If oxidation of the catalyst is required to remove waxes and carbonaceous deposits, the temperature is somewhat higher than in the case of the reduction of the catalyst, usually temperatures above at least about 1500° F. or 1600° F. are used to initiate combustion of the carbonaceous material and waxes.

This invention will be described by reference to the hydrogenation of carbon monoxide in the accompanying drawing. The drawing is a diagrammatic illustration in elevation of an arrangement of apparatus which may be used in the synthesis of hydrocarbons and oxygenated compounds and for the regeneration of a used synthesis catalyst. Although specific reference will be made to conditions of operation and to catalyst, these conditions and catalyst are not to be taken as unnecessarily limiting to the invention.

A synthesis feed gas comprising hydrogen and carbon monoxide in a ratio between about 0.7:1 and about 10:1, usually about 1.5:1, is passed through conduit 3 to a synthesis reactor 4 which comprises a cylindrical chamber having fluid inlets and outlets therein. In synthesis reactor 4 the carbon monoxide is hydrogenated under conditions such that hydrocarbons and oxygenated compounds are produced. In one embodiment of this invention the gases passing upward through reactor 4 are maintained at a velocity below about 6 feet per second under conditions such that the catalyst suspended therein is maintained in a pseudo-liquid dense phase condition. The size of reactor 4 and the quantity of catalyst retained therein is preferably such that a dilute phase is present in the upper portion of reactor 4. The catalyst is introduced into conduit 3 through conduit 49 and comprises in this embodiment a finely divided reduced iron catalyst having a particle size less than about 250 microns. The synthesis conditions of reactor 4 are a temperature of about 600° F., a pressure of about 150 pound per square inch gage, a space velocity equivalent to at least one standard cubic foot of carbon monoxide, per hour, per pound of catalyst in the dense phase, and a residence time of the reaction mixture therein of about 5 to 7 seconds. The reaction effluent comprising hydrocarbons and oxygenated compounds together with unreacted hydrogen and/or carbon monoxide is removed from reactor 4 through outlet conduit 6 in the upper portion thereof. The effluent is passed to a conventional cyclone separator 7. In cyclone separator 7 a small amount of entrained catalyst is removed therefrom and returned either to reactor 4 or to a regeneration chamber 23 through a solids outlet conduit 8, as desired.

Although the above embodiment has been described with reference to the catalyst being present in reactor 4 in a pseudo-liquid condition, it is within the scope of this invention to operate reactor 4 such that the catalyst is entrained in the gaseous mixture therein and is carried with the reaction effluent through conduit 6 to separator 7, which may comprise a settling zone or like means for separating the bulk of the catalyst from the gaseous effluent. A portion of the separated catalyst is returned to reactor 4 by conduit 8 and the remaining portion is either continuously or intermittently passed to regeneration chamber 23 by means not shown and regenerated, which operation will be described more fully hereafter.

The reaction effluent substantially free from catalyst is passed to an accumulator 13 through conduits 9 and 11 and cooler or condenser 12. Condenser 12 cools the reaction effluent to about 150° F. or below and may comprise a single or a series of condensation units. A liquid aqueous phase and a liquid hydrocarbon-rich phase are formed in accumulator 13 and may be withdrawn therefrom through conduit 14 for recovery and purification by means not shown. Uncondensed gases may be removed from accumulator 13 through conduit 16, and may also be passed to a recovery and purification system (not shown) for recovery of products of the process. A portion of the reaction effluent may be recycled through conduits 17 or 18 to reactor 4, if desired.

The reduced iron catalyst in reactor 4 becomes partially oxidized and contaminated with carbonaceous deposits upon use and necessitates reactivation thereof. Accordingly, catalyst is withdrawn either continuously or intermittently from reactor 4 through an outlet conduit 21 which may conveniently comprise a sufficiently long standpipe that the catalyst is forced by gravity into conduit 22 through which a regeneration gas, such as hydrogen, is passing. The regeneration gas in conduit 22 picks up the catalyst from conduit 21 and passes the catalyst to a regenerator 23 which comprises an elongated cylindrical chamber. In regenerator 23 the catalyst is maintained in a fluidized condition, and according to one embodiment of this invention it is maintained in a pseudo-liquid dense phase condition with a dilute phase present in the upper portion of regenerator 23 by admixing with the catalyst a diluent material of the type hereinbefore described. This diluent material is conveniently introduced together with the regeneration gas in conduit 22 in an amount sufficient to comprise at least 50 per cent of the catalyst mass in regenerator 23. The velocity of the gaseous mixture, which in this case is hydrogen, is between about 0.5 and about 6 feet per second, a sufficiently low velocity that a pseudo-liquid dense catalyst phase is formed, and yet a sufficiently high velocity that a tubulent mixture of catalyst and diluent is present in the dense phase of regenerator 23. The diluent material is usually less than about 250 microns in size and of a finely divided form similar in size analysis to the catalyst itself.

A reduction temperature between about 900° F., and about 1600° F., preferably between about 1200° F. and about 1400° F., is maintained in regenerator 23 which is at a pressure substantially equal to the pressure of reactor 4. The gaseous mixture entering regenerator 23 through conduit 22 is usually about 100° F. to about 300° F. above the actual regeneration temperature in regenerator 23 in order to supply the endothermic heat of reaction and mechanical heat losses. In the preferred method of operation, the diluent will comprise about 75 to about 95 per cent of the catalyst mass. The overall reactions taking place during the reaction of the spent iron catalyst are exemplified by the following equations:

(1) $Fe_2O_3 + 3H_2 \rightarrow 2Fe + 3H_2O$
(2) $C + 2H_2 \rightarrow CH_4$

The iron oxide of the reaction illustrated by Equation 1 may be in one or more states of oxidation. The carbon in the reaction illustrated by Equation 2 may be in the form of high molecular weight material or iron carbide as well as the elemental form.

In some instances it may be desirable to pass the partially deactivated catalyst through an oxidation atmosphere prior to regeneration with hydrogen; thus, regenerator 23 may comprise a series of oxidation and reduction chambers. The oxidation of the catalyst removes waxes and carbonaceous deposits therefrom by combustion and a temperature sufficient to initiate combustion of the carbonaceous and wax deposits is necessary. During oxidation the temperature will be at least about 1200° F. After oxidation the catalyst is passed to the reduction chamber where the previously described reduction process is effected. The catalyst may be admixed with the diluent material in either or both the oxidation and reduction chambers in order to maintain the catalyst in a fluidized condition without classification or segregation of catalyst and diluent material.

When regeneration is effected solely by reduction, the reducing gas containing products of the reduction passes from regenerator 23 through conduit 24 to a conventional cyclone separator (not shown) for the removal of any entrained catalyst. After removal of entrained catalyst, the regenerated gas is passed to a scrubber 26 to further remove finely divided solids, and cool the gaseous effluent. Scrubber 26 comprises a cylindrical tower containing a suitable number of baffle plates. It may be unnecessary in many instances to use a preliminary cyclone separator prior to introduction into scrubber 26. In scrubber 26 a scrubbing liquid, such as water, is introduced into the upper portion thereof through conduit 27 and passed downward countercurrently to upward flowing regeneration gas. The water containing finely divided catalyst is removed from scrubber 26 through conduit 28 for disposal or recovery of catalyst and soluble products therefrom. A portion of the scrubbing liquid is withdrawn from conduit 28 and recycled by means of conduit 29 and cooler 31 to scrubber 26. Scrubbed gases are removed from scrubber 26 through conduit 32 to be removed from the system and a portion of the gases may be recycled through conduit 33 if desired. Fresh regeneration gas, in this particular embodiment hydrogen, is introduced into the system through conduit 22 and is admixed with recycled hydrogen from conduit 33 and passed through a preheater 36 where the gaseous mixture is heated to a temperature of about 100° F. to 300° F. above the regeneration temperature. The hydrogen regeneration gas picks up the diluent material, such as finely divided sand or quartz, from conduit 44 and returns the sand or quartz to regenerator 23 through conduit 22 as previously described. Scrubber 26 serves two functions: removal of finely divided catalyst from the effluent, and cooling of the regeneration effluent by contact with water.

Regenerated catalyst is removed either intermittently or continuously from regenerator 23 through conduit 38 and passed through a heat exchanger or cooler 39 to a mechanical separator 41. Cooler 39 cools the catalyst to a sufficiently low temperature that separation can be made between catalyst and diluent in conventional equipment. In separator 41 the diluent material, such as sand, is partially separated or completely separated from the catalytic material, such as metallic iron. In the case of metallic iron or iron oxides, this may conveniently be done by a magnetic operation in a conventional manner known to those skilled in the art. As an example of magnetic operation, the cooled mixture of catalyst and diluent is levelled on a belt conveyor which rolls over a magnetic drum. The sand falls off the end of the conveyor while the iron is magnetized by the magnetic drum and remains on the belt for a short distance until the belt breaks contact with the drum. Other methods may be used for separating the diluent and the catalyst without departing from the scope of this invention. Such methods comprise fluid separation processes in which the free flowing velocity of the materials are utilized by allowing the material to fall through an upward flowing gas whose velocity is such that one material is removed with the upward flowing gas and the other material is removed from the lower portion of the separation equipment. Conventional flotation methods may also be used for separating catalyst and diluent material. It is believed that further description of the separation between diluent material and catalyst is unnecessary as such methods are known to those skilled in the art.

Separated diluent is removed from separator 41 through conduit 42 and passed to a diluent storage tank or surge tank 43. From diluent storage tank 43 the diluent is recycled to regenerator 23 through conduits 44 and 22, as previously described. Separated catalyst is removed from separator 41 through conduit 46 and is passed to catalyst storage tank or surge tank 47. Fresh or make-up catalyst may be introduced into tank 47 when necessary by means not shown. In one embodiment of this invention at least a portion of the feed gas comprising hydrogen and carbon monoxide is passed through conduit 49 and may be combined with recycle gas in conduit 17 and thereafter passed through heater 51 where the feed gas is heated to about 400° F. to 600° F. Thereafter the heated gas is admixed with regenerated catalyst from conduit 48 and returned to feed conduit 3. A portion of the regeneration gas, such as hydrogen, may be introduced into feed line 49 through conduit 34 to increase the ratio of hydrogen to carbon monoxide. It may be desirable to preheat the feed gas prior to introduction of the regenerated catalyst therein since this eliminates the contact of cold gas with hot catalyst and, as a result, substantially increases the life of the catalyst.

The feed gas in conduit 49 may also be heated by recycling a portion of the reaction effluent prior to condensation thereof through conduit 17.

Catalyst and diluent material may be introduced into conduits 49 and 22, respectively, by various methods, such as pressuring the tanks 47 and 43 with a gas or by making conduits 48 and 44 sufficiently long to act as standpipes. The gases in conduits 22 and 49 are brought up to the desired pressure of reactor 4 and regenerator 23 prior to the introduction of catalyst and diluent material therein by means of suitable compressors (not shown).

Various other modifications and arrangements of apparatus may become apparent to those skilled in the art without departing from the scope of this invention. Various heaters, valves, pumps, and condensers, coolers, etc., have been omitted from the drawing for a matter of convenience. For example, water is recycled through conduit 29 by means of a pump (not shown) and gases are passed from conduit 33 to conduits 22 and 49 by means of a suitable low-head compressor (not shown).

The following example is offered as a better illustration of the application of the present invention and the example should not be considered unnecessarily limiting the invention as to either its application or as to conditions of operation.

EXAMPLE

A catalytic contact mass containing about 0.195 pound of carbon, about 0.268 pound of oxygen, and about 0.091 pound of oil and wax per pound of iron is admixed with sufficient finely divided silica sand to form a mixture comprising about 85 per cent of the diluent material. The roller analysis of the catalyst and sand is shown below. The resulting mixture is introduced into a reaction chamber and a stream of hydrogen is passed upward therethrough at a velocity of about 3 or 4 feet per second. The temperature of the reduction process is maintained at about 1450° F. during reduction. The catalyst remains in the reduction chamber for about 6 hours and at least 1 hour after the formation of water has ceased. After this reduction treatment, the catalyst contains about 0.170 pound of carbon, about 0.070 pound of oxygen, and about 0.001 pound of oil and wax per pound of iron. No difficulty is encountered during the high temperature reduction in maintaining the catalyst mass in the pseudo-liquid phase condition.

*Roller analysis of catalyst and diluent*

| Particle Size Microns | Weight Percent Catalyst | Weight Percent Diluent |
|---|---|---|
| 0–10 | 17 | 10 |
| 10–20 | 20 | 15 |
| 20–40 | 24 | 21 |
| 40–60 | 32 | 30 |
| 60+ | 7 | 24 |

The original size of diluent material is larger than the size represented by the above analysis, and, therefore, it is necessary to reduce the diluent material to the above size analysis by grinding in a ball mill.

Various modifications of this invention and various alterations in the type and amount of equipment shown in the drawing will become apparent to those skilled in the art without departing from the scope of the invention. The invention has also been described in the drawing with reference to one embodiment of this invention, and it is obvious that some pieces of equipment and some operational steps may be omitted entirely, if such omissions do not materially affect the regeneration of the catalyst in the presence of a diluent material.

I claim:

1. A continuous process for the hydrogenation of carbon monoxide in the presence of a finely divided hydrogenation catalyst comprising reduced iron as the major component whose fluidization properties are materially impaired by relatively high temperatures and influenced by the character of the fluidization gas which comprises suspending in a fluidized condtion a finely divided reduced iron catalyst containing an alkali in an upward flowing gaseous mixture of hydrogen and carbon monoxide in a reaction zone, maintaining a feed ratio of hydrogen to carbon monoxide between about 0.7:1 and about 10:1, a reaction temperature between about 450° F. and about 750° F., a pressure between about 50 and about 500 pounds per square inch gage, and a linear gas velocity between about 0.1 and about 40 feet per second in said reaction zone, removing a reaction effluent from said reaction zone comprising organic compounds as products of the process, removing partially deactivated catalyst from said reaction zone, regenerating said partially deactivated catalyst by passing said partially deactivated catalyst into a regeneration zone, said regeneration consisting of contact of deactivated catalyst with a reducing gas consisting essentially of hydrogen, suspending said partially deactivated catalyst in said regeneration zone in a fluidized condition in an upward flowing gas consisting essentially of hydrogen in the presence of a diluent material containing no more than a minor proportion by weight of particles greater than 250 microns in size and which constitutes between about 75 and about 95 per cent by weight of the resulting mixture of solids, said diluent material comprising a finely divided inert solid capable of maintaining a fluidized condition under the conditions of regeneration and capable of separation from reduced iron, maintaining a temperature of regeneration between about 1200° F. and about 1600° F. such that deactivated catalyst is substantially reduced, a pressure substantially equivalent to the pressure in said reaction zone and a linear velocity of gas between about 0.1 and about 40 feet per second in said regeneration zone, removing a mixture of reduced iron and diluent material from said regeneration zone, cooling said mixture, separating reduced iron and diluent material, recycling said separated diluent material to said regeneration zone and recycling reduced iron to said reaction zone in which carbon monoxide is hydrogenated.

2. A continuous process for the hydrogenation of carbon monoxide in the presence of a finely divided hydrogenation catalyst comprising reduced iron as the major component whose fluidization properties are materially impaired by relatively high temperatures and influenced by the character of the fluidization gas which comprises suspending in a fluidized condition a finely divided reduced iron catalyst in an upward flowing gaseous mixture of hydrogen and carbon monoxide in a reaction zone, maintaining a feed ratio of hydrogen to carbon monoxide between about 0.7:1 and about 10:1, a reaction temperature between about 450° F. and about 750° F., a pressure between about 50 and about 500 pounds per square inch gage, and a linear gas velocity between about 0.1 and about 40 feet per second in said reaction zone, removing a reaction effluent from said reaction zone comprising organic compounds as products of the process, removing partially deactivated catalyst from said reaction zone, regenerating said partially deactivate catalyst by passing said partially deactivated catalyst into a regeneration zone, said regeneration consisting of contact of deactivated catalyst with a reducing gas consisting essentially of hydrogen, suspending said partially deactivated catalyst in said regeneration zone in a fluidized condition in an upward flowing gas consisting essentially of hydrogen in the presence of a diluent material which constitutes between about 75 and about 95 per cent by weight of the resulting mixture of solids, said diluent material comprising a finely divided inert solid capable of maintaining a fluidized condition under the conditions of regeneration and capable of separation from reduced iron, maintaining a temperature of regeneration between about 1200° F. and about 1600° F. such that deactivated catalyst is substantially reduced, a pressure substantially equivalent to the pressure in said reaction zone and a linear velocity of gas between about 0.1 and about 40 feet per second in said regeneration zone, removing a regeneration effluent from said regeneration zone, removing reduced iron from said regeneration zone, recycling reduced iron to said reaction zone in which carbon monoxide is hydrogenated, and recycling a portion of said regeneration effluent to said reaction zone.

3. A continuous process for the hydrogenation of carbon monoxide in the presence of a finely divided hydrogenation catalyst comprising reduced cobalt as the major component whose fluidization properties are materially impaired by relatively high temperatures and influenced by the fluidization gas which comprises suspending in a fluidized condition a finely divided reduced cobalt catalyst in an upward flowing gaseous mixture of hydrogen and carbon monoxide in a reaction zone, maintaining a feed ratio of hydrogen to carbon monoxide between about 0.7:1 and about 10:1, a reaction temperature between about 350° F. and about 550° F., a pressure between about 50 and about 500 pounds per square inch gage, and a linear gas velocity between about 0.1 and about 40 feet per second in said reaction zone, removing a reaction effluent from said reaction zone comprising organic compounds as products of the process, removing partially deactivated catalyst from said reaction zone, regenerating said partially deactivated catalyst by passing said partially deactivated catalyst into a regeneration zone, said regeneration consisting of contact of deactivated catalyst with a reducing gas consisting essentially of hydrogen, suspending said partially deactivated catalyst in said regeneration zone in a fluidized condition in an upward flowing gas consisting essentially of hydrogen in the presence of a diluent material which constitutes about 75 and about 95 percent by weight of the resulting mixture of solids, said diluent material comprising a finely divided inert solid capable of maintaining a fluidized condition under the conditions of regeneration and capable of separation from reduced cobalt, maintaining a temperature of regeneration between about 650° F. and about 1200° F. such that deactivated catalyst is substantially reduced, a pressure substantially equivalent to the pressure in said reaction zone and a linear velocity of gas between about 0.1 and about 40 feet per second in said regeneration zone, removing a regeneration effluent from said regeneration zone, removing a mixture of reduced cobalt and diluent material from said regeneration zone, cooling said mixture, separating reduced cobalt and diluent material, recycling said separated diluent material to said regeneration zone and recycling reduced cobalt to said reaction zone in which carbon monoxide is hydrogenated.

4. A process for the reduction of an alkali-containing synthesis catalyst which comprises introducing a finely-divided alkali-containing catalyst comprising iron into a reaction zone, passing a reducing gas consisting essentially of hydrogen upwardly through said reaction zone at a velocity effective to suspend said catalyst in said reaction zone in a pseudo-liquid fluidized condition, admixing a diluent material with said synthesis catalyst in said reaction zone in an amount between about 75 and about 95 weight percent of the mixture of catalyst and diluent material to maintain the synthesis catalyst in a fluidized condition in said reaction zone, said diluent material comprising a finely-divided inert solid capable of maintaining a fluidized condition under operating conditions in said reaction zone, the synthesis catalyst and the diluent material each initially contain no more than a minor proportion by weight of material whose particle size is greater than 250 microns including at least 25 weight percent of the material in a particle size smaller than 40 microns, maintaining a temperature in said reaction zone between about 1200 and about 1600° F. and maintaining contact between reducing gas and the synthesis catalyst for a sufficient length of time to cause substantial reduction of said synthesis catalyst.

5. The process of claim 4 in which said diluent material comprises finely divided alumina.

6. The process of claim 4 in which said diluent material comprises finely divided silica sand.

7. The process of claim 4 in which said diluent material comprises a finely divided bentonite type clay.

8. A process for the reduction of a fluidized finely-divided hydrogenation catalyst comprising a reduced metal as the essential catalytically active component which comprises introducing a finely-divided hydrogenation catalyst comprising a reduced metal as an essential catalytically active component into a reaction zone, passing a reducing gas consisting essentially of hydrogen upwardly through said reaction zone at a velocity effective to suspend said catalyst in said reaction zone in a fluidized condition, admixing a diluent material with said hydrogenation catalyst in said reaction zone in an amount between about 75 and about 95 weight percent of the mixture of catalyst and diluent material to maintain the hydrogenation catalyst in a fluidized condition in said reacton zone, said diluent material comprising a finely-divided inert solid capable of maintaining a fluidized condition under the operating conditions in said reaction zone, the hydrogenation catalyst and the diluent material each initially containing no more than a minor proportion by weight of material whose particle size is greater than 250 microns including at least 25 weight percent of the material in a particle size smaller than 40 microns, maintaining a temperature in said reaction zone between about 650° F. and about 1600° F. and maintaining contact between said reducing gas and said hydrogenating catalyst for a sufficient length of time to cause substantial reduction of said hydrogenation catalyst.

9. In a process for the hydrogenation of a carbon oxide in which a gaseous mixture comprising hydrogen and a carbon oxide is contacted with a finely divided hydrogenation catalyst whose fluidization properties are materially impaired by relatively high temperatures and influenced by the character of the fluidization gas, the steps comprising passing a stream of hydrogen and a carbon oxide upwardly through a mass of said finely divided hydrogenation catalyst in a reaction zone at a velocity effective to suspend the mass in said stream, maintaining the temperature in said reaction zone at a level effective to produce the desired catalytic reaction, passing a stream of reducing gas comprising hydrogen upwardly in a reducing zone through a mass of finely divided hydrogenation catalyst at a velocity and in the presence of an amount of diluent material between about 50 and about 95 weight percent of the mixture of catalyst and diluent effective to suspend said mass in said stream of gas, said diluent material comprising a finely divided inert solid capable of maintaining a suspended condition under the conditions of reduction and capable of separation from said catalyst, maintaining the temperature in said reducing zone between about 900° F. and about 1600° F., transferring a portion of the catalyst from said reaction zone to said reducing zone, removing from said reducing zone finely divided solids comprising hydrogenation catalyst and diluent material, thereafter separating hydrogenation catalyst from said diluent material, recycling separated diluent material to said reducing zone, and recycling hydrogenation catalyst thus separated and substantially free from said diluent material to said reaction zone.

10. A process for the reduction of a synthesis catalyst which comprises introducing a finely divided synthesis catalyst into a reaction zone, passing a stream of reducing gas comprising hydrogen upwardly in said reaction zone at a velocity effective to suspend said catalyst in the reducing gas therein, admixing a diluent material with the synthesis catalyst in said reaction zone in an amount between about 75 and about 95 weight percent of the resulting mixture of solids to maintain the synthesis catalyst in a suspended condition in said reaction zone, said diluent material comprising a finely divided inert solid capable of maintaining a suspended condition under the operating conditions employed in said reaction zone, maintaining a temperature in said reaction zone between about 900° F. and about 1600° F. and maintaining contact between reducing gas and said synthesis catalyst for a sufficient length of time to cause substantial reduction of said synthesis catalyst.

THEODORE S. WILLIAMS.

REFERENCES CITED

The following references are of record in the file of this patent:

UNITED STATES PATENTS

| Number | Name | Date |
|---|---|---|
| 2,289,731 | Roelen et al. | July 14, 1942 |
| 2,316,664 | Brassert et al. | Apr. 13, 1943 |
| 2,343,780 | Lewis | Mar. 7, 1944 |
| 2,360,787 | Murphree et al. | Oct. 17, 1944 |
| 2,371,619 | Hartley | Mar. 20, 1945 |
| 2,393,636 | Johnson | Jan. 29, 1946 |
| 2,393,909 | Johnson | Jan. 29, 1946 |
| 2,396,109 | Martin | Mar. 5, 1946 |
| 2,399,984 | Caldwell | May 7, 1946 |
| 2,455,419 | Johnson | Dec. 7, 1948 |
| 2,458,870 | Ogorzaly | Jan. 11, 1949 |
| 2,459,444 | Main | Jan. 18, 1949 |